US012792957B2

(12) United States Patent
Atawia et al.

(10) Patent No.: US 12,792,957 B2
(45) Date of Patent: Nov. 10, 2026

(54) MACHINE LEARNING MODEL REMOTE MANAGEMENT IN ADVANCED COMMUNICATION NETWORKS

(71) Applicant: Dell Products L.P., Round Rock, TX (US)

(72) Inventors: Ramy Atawia, Kanata (CA); Thang Pham, Dollard-des-Ormeaux (CA); Vamsi Krishna Boyapati, Metairie, LA (US)

(73) Assignee: DELL PRODUCTS L.P., Round Rock, TX (US)

( * ) Notice: Subject to any disclaimer, the term of this patent is extended or adjusted under 35 U.S.C. 154(b) by 700 days.

(21) Appl. No.: 18/068,842

(22) Filed: Dec. 20, 2022

(65) Prior Publication Data

US 2024/0202574 A1 Jun. 20, 2024

(51) Int. Cl.
*G06N 20/00* (2019.01)

(52) U.S. Cl.
CPC .................................... *G06N 20/00* (2019.01)

(58) Field of Classification Search
CPC .......... G06N 20/00; G06N 3/098; G06N 3/08; H04L 41/16; H04W 24/02; H04W 88/085
See application file for complete search history.

(56) References Cited

U.S. PATENT DOCUMENTS

2020/0019888 A1* 1/2020 McCourt ................ G06N 20/00
2020/0226502 A1* 7/2020 Liu .......................... G06N 5/01
2020/0327357 A1* 10/2020 Karnagel ............ G06F 18/2113
2021/0174258 A1* 6/2021 Wenchel ................ G06N 20/00
2021/0184989 A1* 6/2021 Wu ........................ H04L 47/762
2022/0012645 A1* 1/2022 Ying ....................... G06N 20/20
2022/0216600 A1* 7/2022 Kumar .................. H04W 24/02
2022/0377844 A1 11/2022 Kumar et al.
2023/0164759 A1* 5/2023 Guchhait .............. H04W 24/02 370/328

OTHER PUBLICATIONS

O-RAN Working Group 2 AI/ML workflow description and requirements (Year: 2019).*

(Continued)

*Primary Examiner* — Mohamed Abou El Seoud
(74) *Attorney, Agent, or Firm* — Amin, Turocy & Watson, LLP

(57) ABSTRACT

The technology described herein is directed towards supporting remote management of machine learning models hosted by network functions in advanced communication networks. Remote management can include model training on more powerful remote machines, along with model selection based on target performance data. A model host (a network function) sends capability data comprising metadata of a local machine learning model to an operator, followed by remote configuration by the operator to enhance the inference accuracy and speed at the network function hosting the model. A model host can retrain a model based on local data, and request remote training if the retrained model does not meet performance criteria. Alternatively, a model host can select a model from a group of models, and request a new model if no selected model of the group meets performance criteria.

20 Claims, 10 Drawing Sheets

(56) References Cited

OTHER PUBLICATIONS

International Search Report and Written Opinion for PCT Application No. PCT/US2023/035953 mailed Mar. 5, 2024, 16 pages.
Tengfei Liu, China Unicom, PR China: "Draft new Recommendation ITU-T Y.3176 (formerly Y .ML-IMT2020-MP) : "ML marketplace integration in future networks including IMT-2020"—for consent;" ITU-T Draft; Study Period 2017-2020; SG13-TD314/PLEN, International Telecommunication Union, Jul. 2020, [https://www.itu.int/ifa/t/2017/sg15/do cs/200907/td/ties/gen/T17-SG15-200907-TD-G EN-0410!!ZIP-E.zip SG13-LS160_att1.docx], pp. 1-31.
Notification Concerning Transmittal of International Preliminary Report on Patentability for PCT Application No. PCT/US2023/035953 mailed Jul. 3, 2025, 9 pages.
European Office Action mailed Jul. 29, 2025 for European Patent Application No. 23813124.7, 3 pages.

* cited by examiner

MACHINE LEARNING MODEL REMOTE MANAGEMENT IN ADVANCED COMMUNICATION NETWORKS

BACKGROUND

Different radio access network (RAN) optimization use-cases can apply different machine learning models for real-time predictions. This includes supervised, unsupervised and reinforcement learning models in order to strike a balance between training complexity and use-case specific performance. Such models need to be managed through the RAN life cycle to cope with various new RAN functionalities and traffic models appearing in the network.

In Open-radio access network (O-RAN, or sometimes also referred to as Open RAN), machine learning models can be deployed at the edge nodes (e.g., a near-real-time RAN intelligent controller, or near-RT RIC), a distributed unit (DU) or centralized unit (CU)) for fast optimization actions. These machine learning models are managed remotely by an operator (e.g., via service management and orchestration, or SMO component) in order to change the selected machine learning models or tune some of their hyperparameters (after external training on powerful machines).

In O-RAN deployments, the model operator (e.g., coupled via the SMO) and the model host (e.g., the near-RT RIC) can be sourced from different vendors, thus adopting different software images, platforms and hardware models. In multi-vendor deployments, the discrepancy makes machine learning model management very challenging when considering dynamic network conditions (e.g., time-varying traffic type and load). As a result, the network will likely use a sub-optimally trained machine learning model, which results in performance degradation. Alternatively, the operator will need to perform human-based manual model updates (e.g., logging remotely to the inference host), which increases the overall operational costs of an O-RAN deployment.

Existing O-RAN approaches for machine learning model deployment include an image-based option and a software-based option. In the image-based option, the operator sends a container with machine model software and dependencies (e.g., libraries). Among the drawbacks of the image-based option is the dependency on model host hardware capabilities; for instance, the model host must support the same container runtime environment. In addition, model hosts with low hardware capabilities (compared to the model operator hardware) suffer from low runtime efficiency. In the software-based option, the operator sends a model file; this approach results in a significant drawback because it requires that both the model operator and host support the same machine learning software libraries. Consider an example in which the model operator runs on a powerful machine (e.g., with high central processing unit (CPU) power=100), and supports machine learning models as python files, while the model host runs on more modest machines (e.g., CPU power=10), and supports only machine learning models in C++ (cpp files). As such, an engineer must perform software upgrades to match software of both entities (high cost), and the model training and inference at the host will take a long time to provide network recommendations, resulting in suboptimal network performance.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein are generally directed towards remotely managing machine learning models, including in an O-RAN based implementation. A network function publishes its machine learning capabilities for post-processing on a remote machine (e.g., via the service management and orchestration (SMO)) component. Example network functions that can advertise their capability data can include, but are not limited to, a near-real-time RAN intelligent controller (near-RT RIC), a distributed unit (DU), centralized unit (CU), radio unit (RU) or the like. In this way, each network function that hosts at least one machine learning model exposes its machine learning model capability data, such as including, but not limited to, supported model names, input key performance indicators (KPIs), features, output actions and/or the like. As a result, software images, platforms and hardware models can be matched to the published machine learning capabilities of the model host.

As will be understood, the machine learning model post-processing can include training, model selection, configuration, and/or activation/deactivation of a model over (e.g., O-RAN) defined interfaces (e.g., A1 and 01) that connect the operator and the network function that will be or currently is hosting the model. The operator, via the SMO orchestrator, trains the model in which the parameters and coefficients are tuned to improve the inference performance. As also described herein, one or more input features can be added (to improve the model's performance) or removed (to decrease the model's complexity), which facilitates adaptability. As a result of such adaptability, any mismatch between the model operator's (e.g., powerful) hardware and the model host's (e.g., less powerful hardware) is leveled out.

Figure 4:
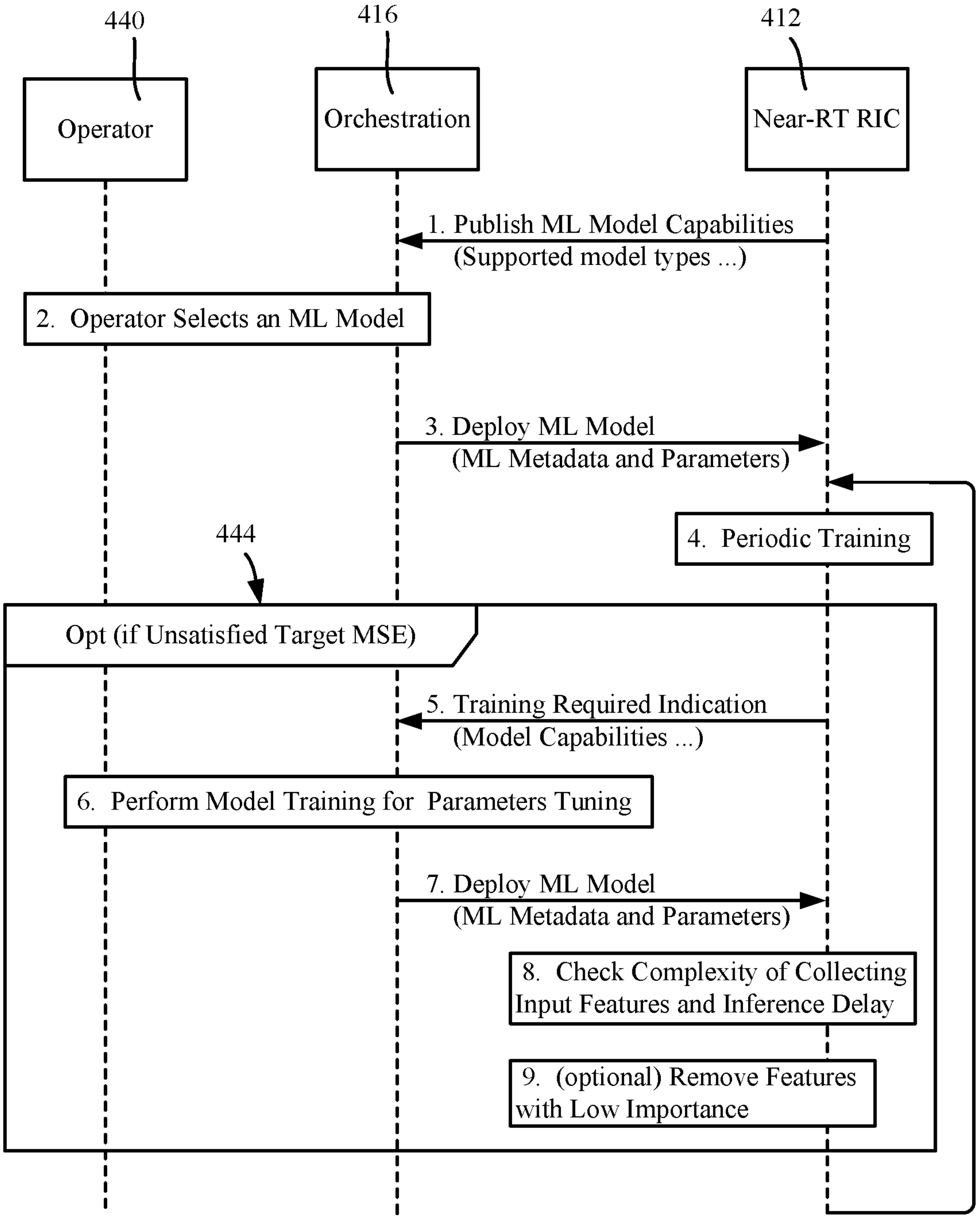
FIG. 4 is an example component and signaling diagram showing example dataflow sequences related to an embodiment for machine learning model metadata and configuration exchange, in accordance with various aspects and implementations of the subject disclosure.

In one example embodiment, generally represented in FIG. 4, a machine learning model is communicated and deployed using the O-RAN defined configuration O1 interface. To this end, the O1 interface (e.g., Yang files) is updated to include machine learning model parameters such as model name, model-specific parameters and coefficients determined during training. For example, the operator may specify a neural network model such as including coefficients, layers, input key performance indicators (KPIs) and model output (either a KPI or a network decision such a configuration parameter value). The standard defined network configuration (NETCONF) protocol can be used for initial model configuration as well as model update during runtime.

Figure 5:
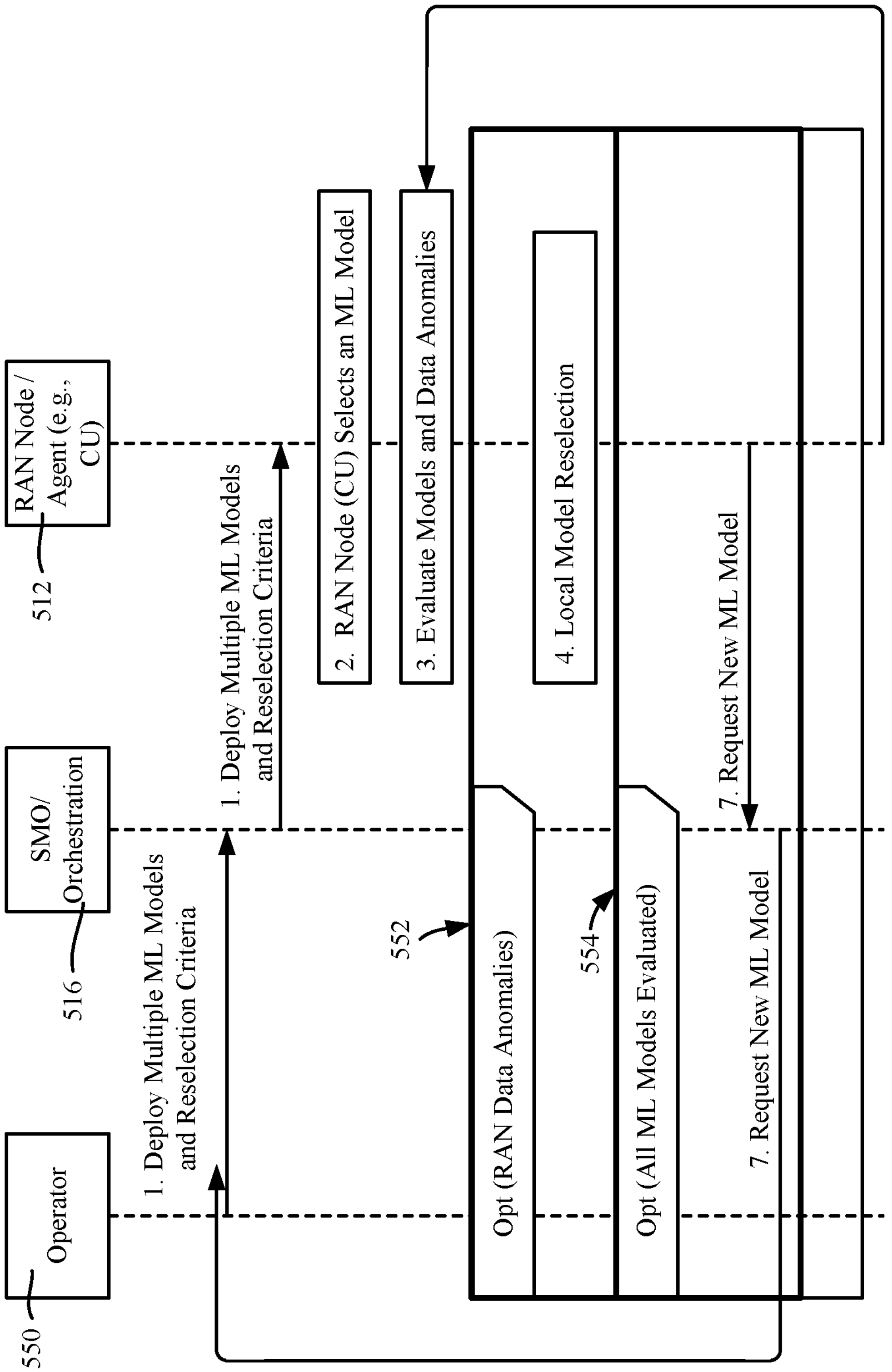
FIG. 5 is an example component and signaling diagram showing example dataflow sequences related to an embodiment for remote machine learning model selection, in accordance with various aspects and implementations of the subject disclosure.

In another example embodiment, generally represented in FIG. 5, the host is configured for remote machine learning model selection. In this embodiment, the model host supports multiple machine learning models (e.g., communicated and deployed as above); however, the host has insufficient resources to train all the models and instead selects a most likely optimal one. The host can evaluate the performance of the model against a reselection criterion (or criteria) that allows the local host to reselect between the different models, locally, during runtime when performance is not adequate. The host can also request the operator to reevaluate and reselect or redeploy a new model (or group of models) over the O1 or A1 O-RAN interfaces. The selection by the operator can be based on indicated model performance by a performance monitoring module (at the SMO), and can also indicate a performance-based reselection criteria that allows the local host to reselect between the different models, locally, during runtime.

It should be understood that any of the examples herein are non-limiting. As one example, the technology is described in an O-RAN environment, however, this is only an example and can be implemented in similar environments, including those not yet implemented. Thus, any of the embodiments, aspects, concepts, structures, functionalities or examples described herein are non-limiting, and the technology may be used in various ways that provide benefits and advantages in communications and computing in general. It also should be noted that terms used herein, such as "optimize" or "optimal" and the like (e.g., "maximize," "minimize" and so on) only represent objectives to move towards a more optimal state, rather than necessarily obtaining ideal results.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
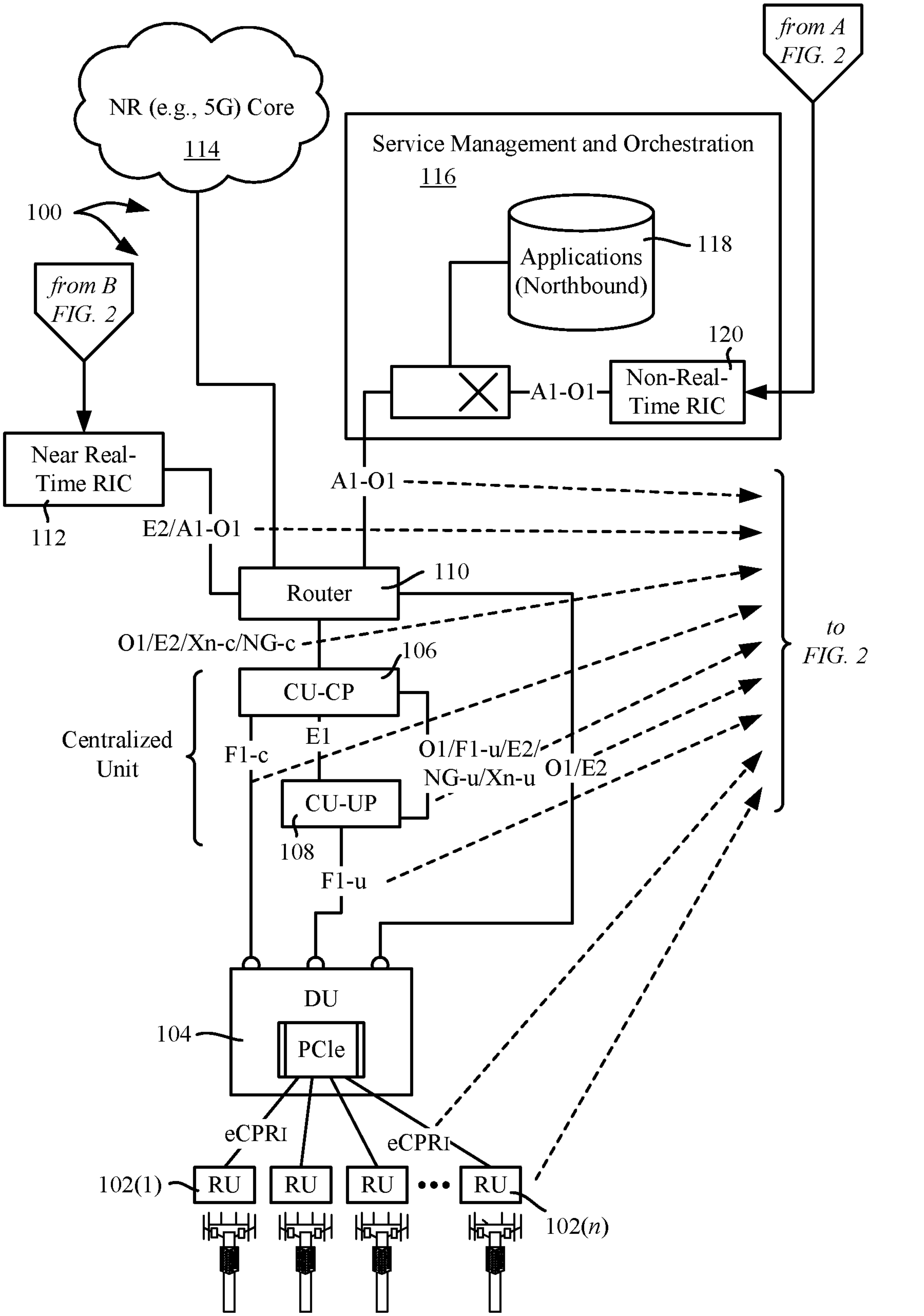
FIGS. 1 and 2 comprise a block diagram representation of a system/architecture of example radio access network (RAN) components by which machine learning models can be remotely managed, in accordance with various aspects and implementations of the subject disclosure.
Figure 2:
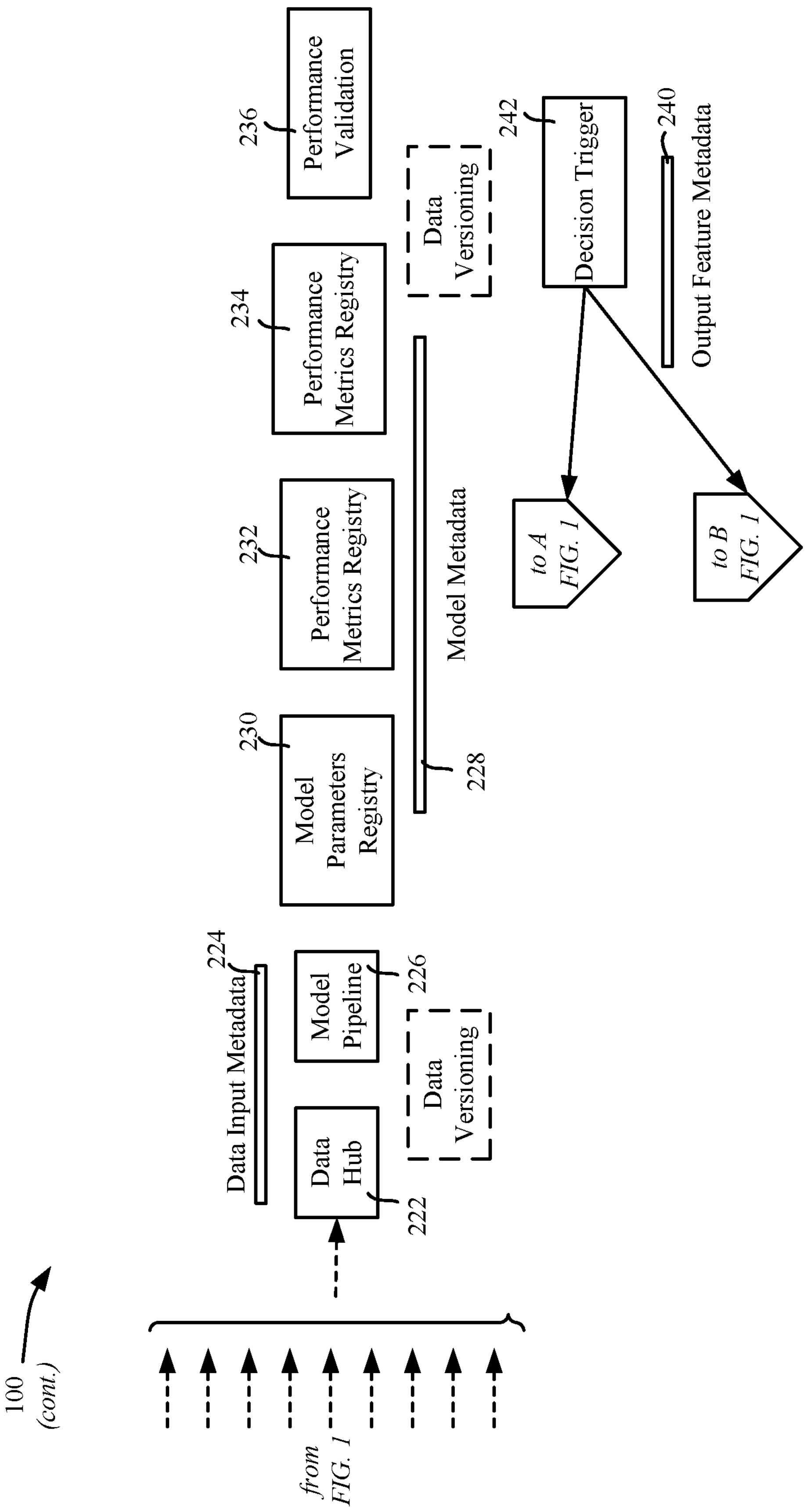

FIGS. 1 and 2 show a system/architecture 100 of RAN agents, including radio units 102(1)-102(*n*), coupled via an enhanced Common Public Radio Interface (eCPRI) to a distributed unit (DU) 104 (with PCI Express® (PCIe) accelerator). In turn, the DU 104 is coupled over defined interfaces to a centralized unit control plane (CU-CP) 106 (via F1-C fronthaul control plane interface) and centralized unit user plane (CU-UP) 108 via F1-U fronthaul user plane interface, and via an O1/E2 interface to a router 110. The router 110 is also communicatively coupled to the CU-CP 106.

The router 110 facilitates communications between these components and a near real-time RIC 112, the new radio core 114 and the service management and orchestration component 116. The service management and orchestration component 116 includes applications 118 and a non-real time RIC 120.

The dashed arrows depicted in FIG. 1 show that data communications of the system agents via the interfaces are coupled/deposited to a data hub 222 (FIG. 2), whereby communications via the interfaces are accessible to the other components depicted in FIG. 2. In FIG. 2, the thick line 224 indicates the data related metadata in the yang model for machine learning being coupled to a model pipeline 226. The model parameters and registry metadata in the yang model for machine learning are represented by the thick line 228, and are accessible to a model parameters registry 230, performance metrics registries 232 and 234, which can be used for performance validation (block) 236. The solid line 240 indicates the output decision/feature metadata in the yang model for machine learning, with a decision trigger component 242 coupled and to the non-real time RIC 120 and to the near-real time RIC 112 of FIG. 1.

Figure 3:
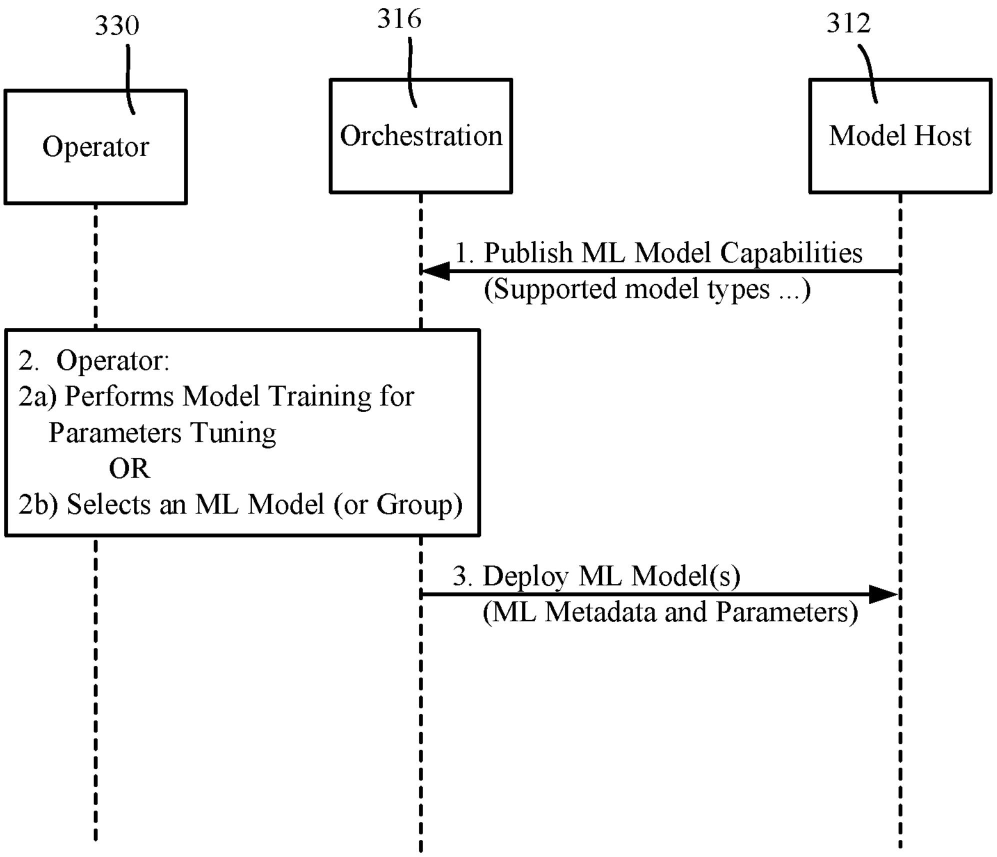
FIG. 3 is an example component, dataflow and sequence diagram showing an overview of operations related to remote management of machine learning models, in accordance with various aspects and implementations of the subject disclosure.

FIG. 3 shows a general overview of the sequence and dataflow between an operator 330, orchestration component (SMO) 316 and a model host 312. The model host 312, as represented by arrow one (1), exposes its machine learning model capabilities such as supported model names, input KPIs (features), and output actions.

As represented by the block two (2), the operator, via the SMO orchestrator 316, (2a) trains the model in which the parameters and coefficients are tuned to improve the inference performance. Some input features can be added (to improve the performance) or removed (to decrease complexity). The operator 330 can also select (2b) a machine learning model (or group of models) to the model host 312.

As represented by the arrow three (3), the operator 330/orchestration component 316 sends the machine learning model metadata and parameters to the model host (the network function that published its capability data), whereby the machine learning model host 312 applies the associated parameters to existing local models, that is, in the host's environment and software, and sends a confirmation message (not explicitly shown). The network function that is the model host 312 uses the indicated parameters for local decisions and model operation, including for real-time inference using local/actually observed data to trigger model retraining, decreasing the features when appropriate to reduce complexity.

In general, the application metadata can be used and pipelined through the yang model. The components of the RAN can be identified with their specific data and related models with the structure comprised of "affiliation" and "agents," where an affiliation defines the component to which the data/model is associated. For example, the data can be procured from the radio and consumed for the building of a model whose output is consumed by the LI CPU component; in such an example the radio and the LI CPU are affiliations to each other.

Each affiliation can be associated with an agent for data generation. For example, in the above example, the radio can be the agent of data generation. In another example, the front haul user plane or physical resource block (PRB) data can be affiliated with the DU, CU and RU performance, acting as agents for the fronthaul traffic management model outcomes. To summarize, affiliation (DU/CU/RU) can refer to a model dedicated for the DU/CU/RU component, and an example affinity group (PRB) can refer to an overall model affinity group (PRB, cell site, cell etc.). An agent (associated agent) can refer to any associated agent; there can be an agent ID, an agent communication API, an agent function, and agent database and agent security classification data.

The machine learning model metadata allows any agent (e.g., RIC, CU, DU and so on) to locally recreate and train the model, then use the model for inference. Model types can include, but are not limited to, regression/classification/clustering/Timeseries/neural network (NN)/Federated Learning (FL)/Reinforcement Learning (RL) and the like. The data metadata represents the key data that is used for the model with which a data ingestion into ML training is triggered, and can include, but are not limited to describing the input feature pipeline, output statistics, data field, data table, data time stamp and data pipeline API name. Training parameter metadata can include, but are not limited to, describing the splitting ratio (e.g., 70/30, 60/40, 80/20) indicating the ratio between training and validation data, testing k folds (e.g., 2, 4, 6, 8, 10, 12): used for local model hyperparameter tuning, and testing feedback loop parameters used for lagged differentiation in timeseries analysis models such as autoregressive integrated moving average (ARIMA). Tuning metadata can include tuning hyperparameters such as number of trees, pdq (where: p is the number of autoregressive terms, d is the number of nonseasonal differences needed for stationarity, and q is the number of lagged forecast errors in the prediction equation), number of layers). Debug metadata can include model debug metadata with acute results, including decisive threshold for components of RAN. Validation metadata can include feature importance (FI) and impact to the output with plots (metadata).

Overall, the configuration (e.g., via yang file) comprises the complete pipeline for a particular application. The application metadata model configuration, state data, and administrative actions can be manipulated by the network configuration (NETCONF) protocol.

As set forth herein, in a first embodiment the technology described herein is represented in FIG. 4, which shows an example representation sequence and dataflow diagram of one embodiment, beginning at arrow one (1) where the model host 412 (in this example, the host network function is a near-real time RIC) publishes its machine learning model capability data (via the SMO 416), which exposes host-specific information such as supported model names, input KPIs (features), and output actions. As represented via block two (2) and arrow three (3), the operator 440 selects a machine learning model based on the model host's capability data and communicates the selected model for deployment by the model host.

The host 412 performs local training, (e.g., periodically or otherwise triggered), as represented by block four (4). Local training uses actual locally observed data, along with the training percentage indicated in the metadata by the operator over the O1 interface.

The host 412 evaluates the locally trained model based on the training percentage indicated in the metadata and compares the result against an error metric (e.g., the mean squared error) also indicated in in the metadata by the operator 440, and/or an operator specified quality of service (QOS) KPI or KPIs (e.g., handover success rate).

If the model is not satisfying the value(s) specified by the operator in the metadata, remote training is needed. This is generally represented in block 444 of FIG. 4. At arrow five (5), the host 412 sends its model capabilities via the SMO 416 to the operator 440 indicating a need for remote training.

As represented via block six (6) and arrow seven (7), the operator 440 trains the model and sends back updated hyperparameters to the host 412 for further inference by the host 412. As part of the inference process, as represented by block eight (8), the host 412 calculates/estimates the complexity data, such as the time and resources (memory and processing) needed to collect each input feature and its impact on the inference delay. As represented by block nine (9), in the case of compute resource congestion, the host 412 removes one or more features with lower importance, wherein such lower importance features are indicated by the operator 440 in the metadata.

As also set forth herein, in another embodiment the technology described herein is represented in FIG. 5. In this embodiment, multiple machine learning models are deployed and hosted at the network function/RAN agent (node) 512, to be used during runtime, and continuously/regularly evaluated based on RAN KPIs. In this example, the model host network function/RAN agent 512 can be a centralized unit. Model reselection occurs in the case of a data anomaly or low RAN KPIs.

Thus, with the arrows labeled one (1) in FIG. 5, which generally corresponds to the arrow three (3) of FIG. 3, the operator, via the SMO 516, configures multiple machine learning models and deploys them to the RAN node 512, and can indicate the status of each machine learning model as activated or deactivated. Only one machine learning model is activated at a time. Note that as shown in FIG. 5 via block 512, if not preselected for the RAN node 512, the RAN node 512 can select its own machine learning model, such as based on metadata sent with each model, e.g., by matching training parameter data to locally observed data.

The operator 550/SMO 516 can provide the RAN node 512 with reselection criteria associated with each machine learning model. Examples include providing target RAN KPIs to as criterion data to evaluate, and/or processing requirements; (e.g., the RAN node should select a simpler model in the case of high CPU utilization).

During runtime, the RAN node 512 evaluates the performance (block 3 in FIG. 5) of the currently activated machine learning model, and triggers reselection (block 4) if and when appropriate. In one implementation, this occurs based on satisfying (or not satisfying) conditional criteria, e.g., including when a RAN KPI has dropped below a target value, such as below a handover success rate or a user throughput metric.

Another reselection criterion can include when the observed values of machine learning input features (RAN KPIs) are out of range of the KPIs used for model training, that is, there are data anomalies (block 552). As a simplified example, consider that model training used feature values between 0 and 100, but the observed values are between 100 and 200; attempting to use one of the machine learning models trained with the significantly different feature values is likely to fail (although if desired, a reselection attempt can be made).

In the case of meeting one or more of the criteria for reselection, the RAN node can reselect another model (if available locally), or request a new model (or group of models) from the SMO 516/operator 550, as represented in FIG. 5 via the arrows labeled seven (7). Such a request occurs when all the available models have been evaluated (block 544), either by having been previously selected and tried and determined to have low performance, or by having been deemed to likely fail (e.g., to a relatively high certainty), such as based on a significant training data/observed data mismatch.

Upon receiving the request from the RAN node 512, the operator 550, via the SMO 516, provides at least one new model for deployment, and can remove one or more of the existing models. Note that the RAN node 512 can supply information in association with the request that explains/suggests a reason for the request, such as the observed values (e.g., including the actual observed range of values) being mismatched with the training values (e.g., the range used in training). If information regarding the observed values is provided by the RAN node 512, the operator 550 can provide a model trained with a more appropriate range of values for this RAN node 512.

Figure 6:
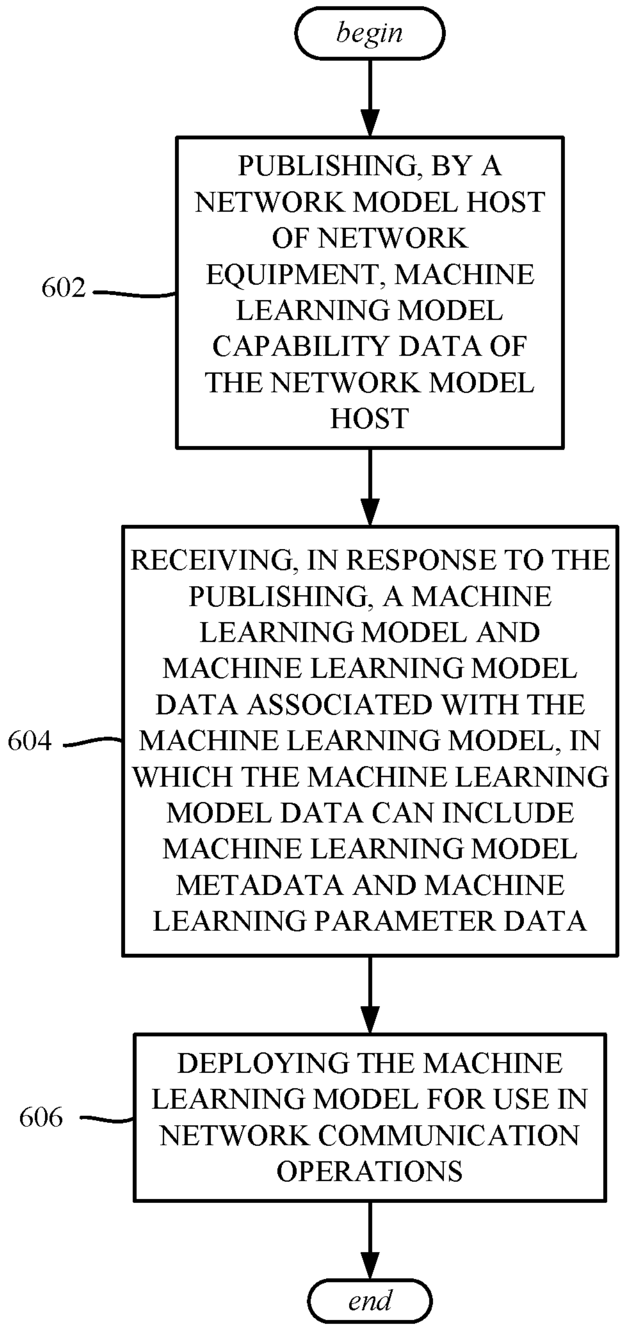
FIG. 6 is a flow diagram showing example operations related to receiving a machine learning model and related data at a model host, in response to the model host publishing machine learning model capability data, in accordance with various aspects and implementations of the subject disclosure.

One or more aspects can be embodied in network equipment, such as represented in the example operations of FIG. 6, and for example can include a memory that stores computer executable components and/or operations, and a processor that executes computer executable components and/or operations stored in the memory. Example operations can include operation 602, which represents publishing, by a network model host of network equipment, machine learning model capability data of the network model host. Example operation 604 represents receiving, in response to the publishing, a machine learning model and machine learning model data associated with the machine learning model, in which the machine learning model data can include machine learning model metadata and machine learning parameter data. Example operation 606 represents deploying the machine learning model for use in network communication operations.

Further operations can include training the machine learning model using local data to obtain an inference result, evaluating the inference result with respect to information in the machine learning model metadata, and, in response to the evaluating of the inference result not satisfying the information in the machine learning model metadata, outputting a request for remote training.

Further operations can include receiving, in response to the request, updated hyperparameter data, updated machine learning model metadata, and updated machine learning parameter data, and retraining the machine learning model based on the updated hyperparameter data.

Further operations can include estimating, prior to the retraining, complexity data of the retraining, and, in response to the complexity data exceeding complexity criterion data, removing at least one input feature from a set of retraining-related input features to collect based on feature importance data in the updated machine learning model metadata.

The network model host can include a radio access network intelligent controller of network service management and orchestration equipment.

The network equipment can include a radio access network node.

The machine learning model metadata can include at least one of: model type data, training-related data, training parameter data, training parameter data, tuning metadata, debug metadata, or validation metadata.

Receiving the machine learning model can include receiving the machine learning model as part of a group of received machine learning models, and further operations can include selecting the machine learning model for the deploying of the machine learning model.

The machine learning model can be a first machine learning model, and further operations can include evaluating operating result data obtained after the deploying of the machine learning model with respect to reselection criterion data obtained in conjunction with the group of received machine learning models, selecting, based on the operating result data and the reselection criterion data, a second machine learning model from the group of received machine learning models, and deploying the second machine learning model for use in the network communication operations.

Further operations can include determining that no machine learning model of the group of received machine learning models is capable of satisfying the operating result data and the reselection criterion data, and requesting, based on the determining, a different machine learning model that is not in the group of received machine learning models.

Further operations can include generating feedback information in association with the requesting; the feedback information can include information to assist in obtaining a model of the group of received machine learning models that is capable of satisfying the operating result data and the reselection criterion data.

Figure 7:
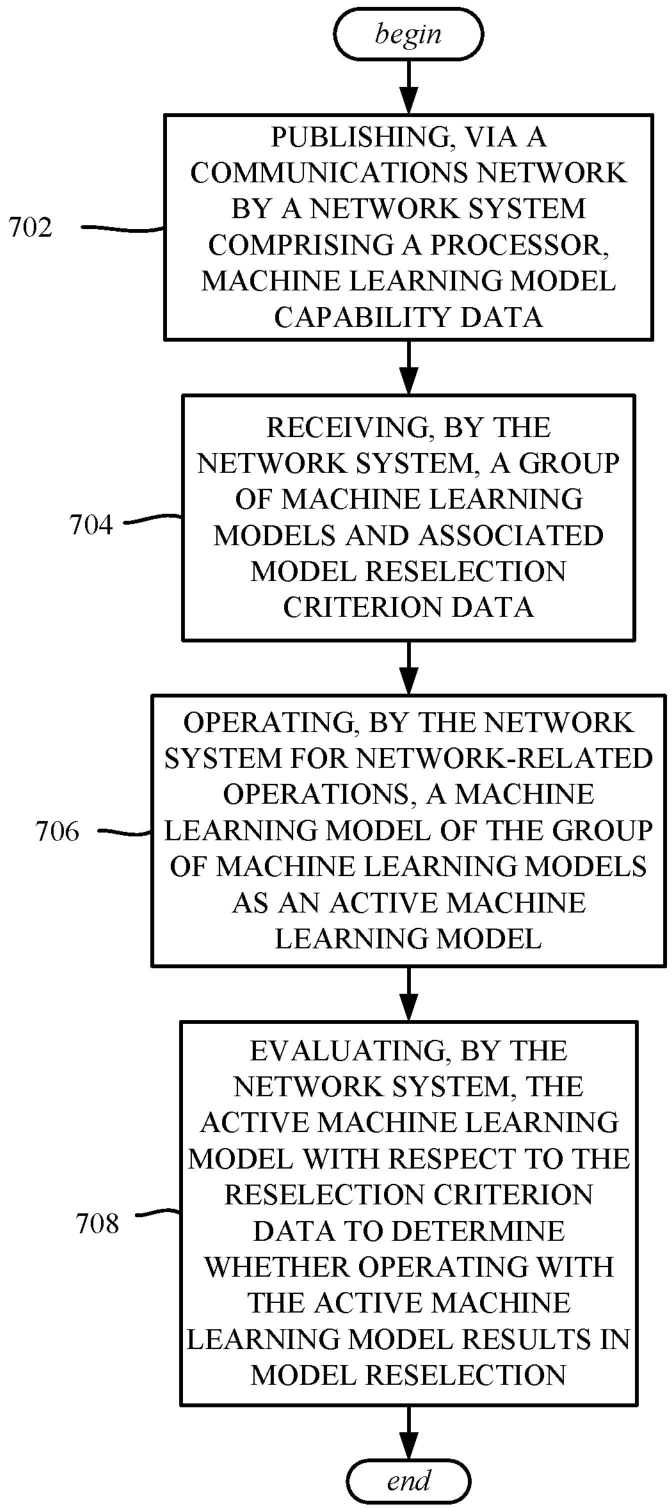
FIG. 7 is a flow diagram showing example operations related to receiving a group of machine learning models and related data at a model host for selection, in response to the model host publishing machine learning model capability data, in accordance with various aspects and implementations of the subject disclosure.

One or more example aspects, such as corresponding to example operations of a method, are represented in FIG. 7. Example operation 702 represents publishing, via a communications network by a network system comprising a processor, machine learning model capability data. Example operation 704 represents receiving, by the network system, a group of machine learning models and associated model reselection criterion data. Example operation 706 represents operating, by the network system for network-related operations, a machine learning model of the group of machine learning models as an active machine learning model. Example operation 708 represents evaluating, by the network system, the active machine learning model with respect to the reselection criterion data to determine whether operating with the active machine learning model results in model reselection.

The active machine learning model can include a first machine learning model of the group, and further comprising, determining, based on the evaluating, that the active machine learning model triggers a reselection operation, and further comprising performing, by the network system, the reselection operation to select a second machine learning model of the group, and operating, by the network system for network-related operations, the second machine learning model of the group as the active machine learning model.

Further operations can include determining, by the network system, that each machine learning models of the group triggers the model reselection operation, and requesting, by the network system to the communications network, a different machine learning model that is not part of the group for use as the active machine learning model.

Further operations can include providing, by the network system in association with the requesting, explanatory data to assist in obtaining the different machine learning model that is not part of the group.

Determining that each machine learning models of the group triggers the model reselection operation can include operating each of the machine learning models of the group as an active machine learning model instance, and determining that each machine learning model instance triggers the associated model reselection criterion data.

Figure 8:
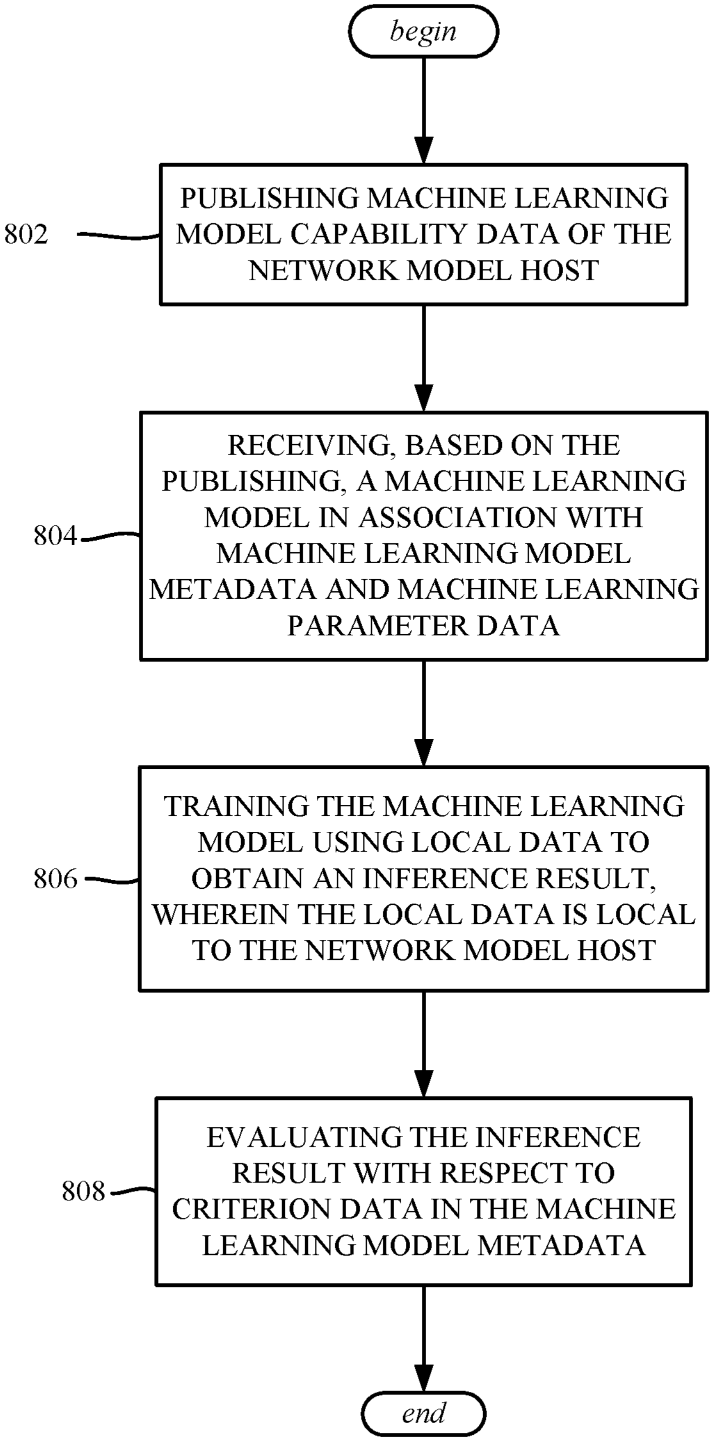
FIG. 8 is a flow diagram showing example operations related to receiving a machine learning model and related data at a model host, and training the machine learning model at the model host, in accordance with various aspects and implementations of the subject disclosure.

FIG. 8 summarizes various example operations, e.g., corresponding to a machine-readable medium, comprising executable instructions that, when executed by a processor of a network model host, facilitate performance of operations. Example operation 802 represents publishing machine learning model capability data of the network model host. Example operation 804 represents receiving, based on the publishing, a machine learning model in association with machine learning model metadata and machine learning parameter data. Example operation 806 represents training the machine learning model using local data to obtain an inference result, wherein the local data is local to the network model host. Example operation 808 represents evaluating the inference result with respect to criterion data in the machine learning model metadata.

Further operations can include, in response to the evaluating of the inference result being determined not to satisfy the criterion data, outputting a request for remote training.

The inference result can be a first inference result, the criterion data can include first criterion data, and further operations can include receiving, in response to the request, updated hyper-parameter data, updated machine learning model metadata, and updated machine learning parameter data, retraining the machine learning model based on the updated hyper-parameter data to obtain a second inference result, and reevaluating the second inference result with respect to second criterion in the machine learning model metadata.

The updated machine learning model metadata can include feature importance data, and further operations can include, prior to the retraining, determining complexity data representing complexity of the retraining, and, in response to the complexity data being determined to exceed complexity criterion data, removing an input feature from a group of retraining-related features based on the feature importance data.

As can be seen, the technology described herein facilitates remote management of machine learning models. An inference model host can self-optimize model selection based on factors such as processing overhead and RAN KPIs. The technology described herein facilitates interworking as a result of model selection and format being based on inference host capabilities. Models can be deployed similar to current configuration management strategies of CU and DU RAN parameters.

As a result of the technology described herein, the existing hardware and software dependencies of both the model host and operator on each other are removed, providing the operator with more flexibility in selecting RAN and SMO vendors. The technology described herein enables autonomous RAN optimization based on actively training machine learning models that improve the accuracy of real time decisions; the technology adapts the selected machine learning model and its configuration according to the use-case, type of deployment and time-varying processing capabilities of the network function.

Figure 9:
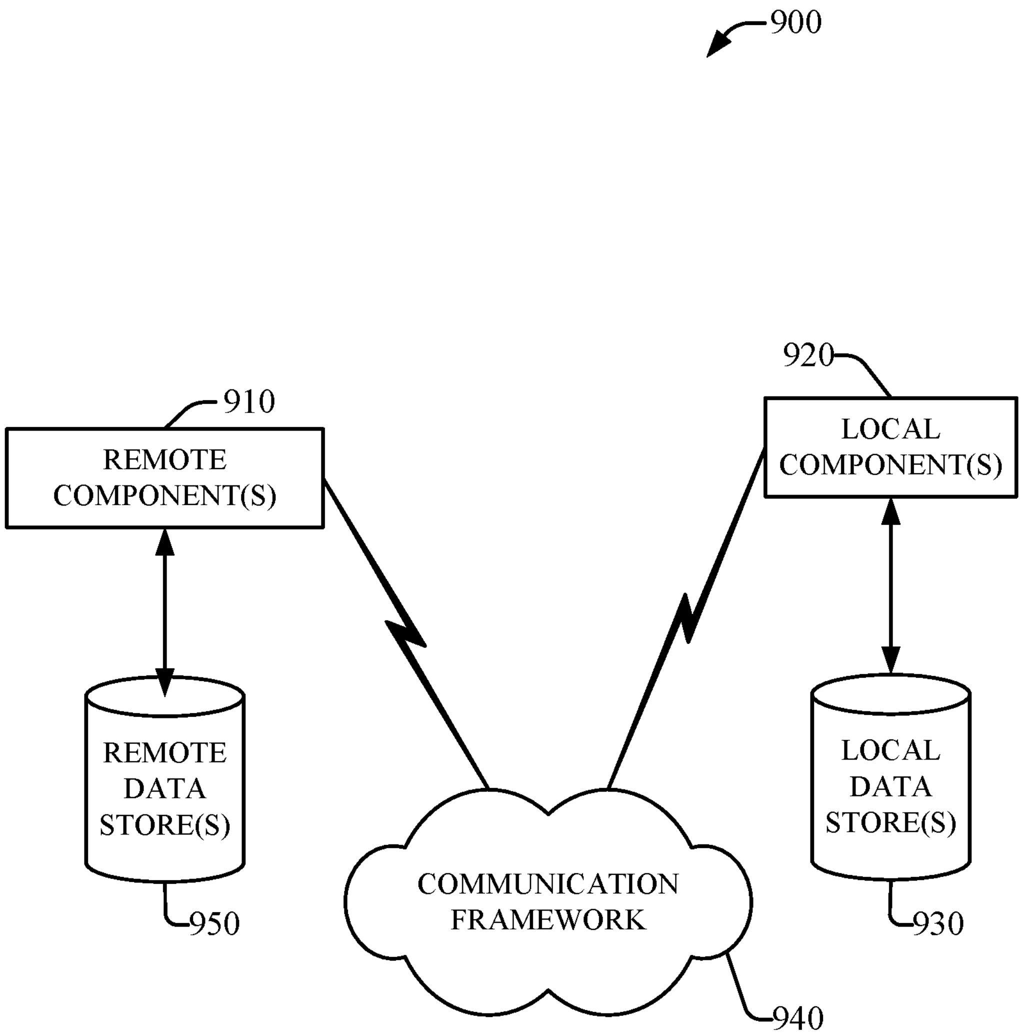
FIG. 9 is a block diagram representing an example computing environment into which aspects of the subject matter described herein may be incorporated.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise an automatic scaling component and/or programs that communicate/use the remote resources 910, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component (s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
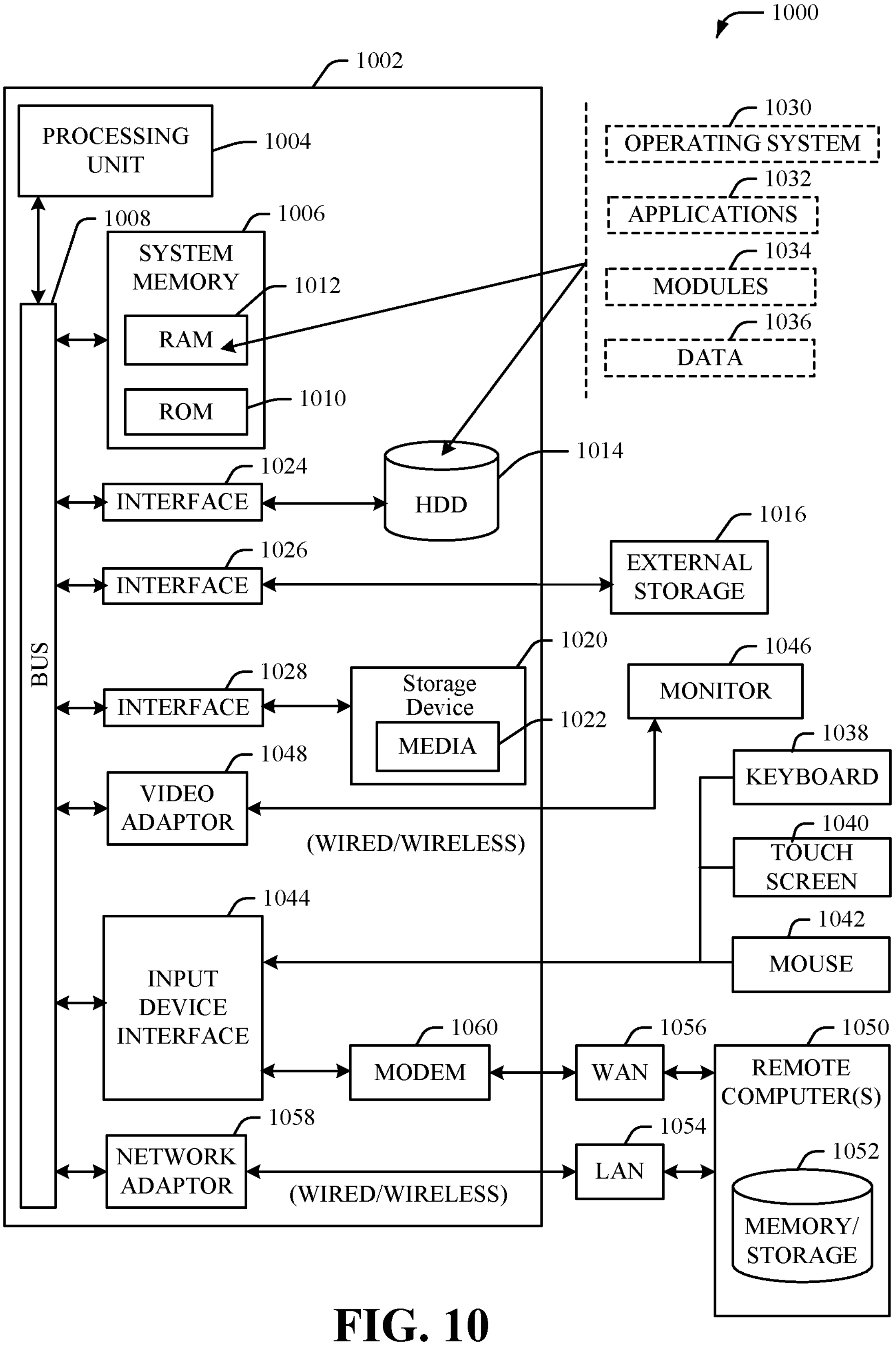
FIG. 10 depicts an example schematic block diagram of a computing environment with which the disclosed subject matter can interact/be implemented at least in part, in accordance with various aspects and implementations of the subject disclosure.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IOT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014.

Other internal or external storage can include at least one other storage device 1020 with storage media 1022 (e.g., a solid state storage device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device(s) 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1094 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

at least one processor; and at least one memory that stores executable instructions that, when executed by the at least one processor, facilitate performance of operations, the operations comprising:

publishing, by a network model host of network equipment, machine learning model capability data of the network model host, wherein the machine learning model capability data comprises supported model names, input key performance indicators, and output actions associated with the network model host;

receiving, in response to the publishing, a machine learning model and machine learning model data associated with the machine learning model, wherein the machine learning model data comprises machine learning model metadata and machine learning parameter data, and wherein the machine learning parameter data comprise defined Yang files;

generating explanatory data comprising observed input feature values mismatched with training values used to train the machine learning model;

estimating complexity data representing time and resources needed to collect each input feature and impact on inference delay and, in response to compute resource congestion, removing one or more input features indicated by feature importance data in the machine learning model metadata; and deploying, using a defined NETCONF protocol, the machine learning model for use in network communication operations.

2. The system of claim 1, wherein the operations further comprise training the machine learning model using local data to obtain an inference result, and, in response to an evaluation of the inference result, with respect to information in the machine learning model metadata, not satisfying the information in the machine learning model metadata, outputting a request for remote training.

3. The system of claim 2, wherein the operations further comprise receiving, in response to the request, updated hyperparameter data, updated machine learning model metadata, and updated machine learning parameter data, and retraining the machine learning model based on the updated hyperparameter data.

4. The system of claim 1, wherein the network model host comprises a radio access network intelligent controller of network service management and orchestration equipment.

5. The system of claim 1, wherein the network equipment comprises a radio access network node.

6. The system of claim 1, wherein the machine learning model metadata comprises at least one of: model type data, training-related data, training parameter data, tuning metadata, debug metadata, or validation metadata.

7. The system of claim 1, wherein the receiving of the machine learning model comprises receiving the machine learning model as part of a group of received machine learning models.

8. The system of claim 7, wherein the machine learning model is a first machine learning model, and wherein the operations further comprise deploying a second machine learning model, of the group of received machine learning models, for use in the network communication operations, wherein the second machine learning model has been selected for deployment based on operating result data and reselection criterion data.

9. A method, comprising:

publishing, via a communications network by a network system comprising at least one processor, machine learning model capability data, wherein the machine learning model capability data comprises supported model names, input key performance indicators, and output actions associated with a group of machine learning models;

receiving, by the network system, the group of machine learning models and associated model reselection criterion data comprising defined Yang files, wherein the network system generates explanatory data comprising observed input feature values mismatched with training values used to train the group of machine learning models;

estimating, by the network system, complexity data representing time and resources needed to collect each input feature and impact on inference delay;

in response to compute resource congestion, removing, by the network system, one or more input features indicated by feature importance data in machine learning model metadata;

operating, by the network system for network-related operations, a machine learning model of the group of machine learning models as an active machine learning model, wherein the machine learning model has been deployed using a defined NETCONF protocol; and evaluating, by the network system, the active machine learning model with respect to the reselection criterion data to determine whether operating with the active machine learning model results in model reselection.

10. The method of claim 9, wherein the active machine learning model comprises a first machine learning model of the group of machine learning models, and further comprising:

performing, by the network system, a reselection operation to select a second machine learning model of the group of machine learning models, and operating, by the network system for network-related operations, the second machine learning model of the group of machine learning models as the active machine learning model, wherein the second machine learning model has been determined to trigger the reselection operation.

11. The method of claim 10, further comprising:

requesting, by the network system to the communications network, a different machine learning model that is not part of the group of machine learning models for use as the active machine learning model, wherein each machine learning model of the group of machine learning models has been determined to trigger the reselection operation.

12. The method of claim 11, further comprising providing, by the network system in association with the requesting, the explanatory data to assist in obtaining the different machine learning model that is not part of the group of machine learning models.

13. The method of claim 11, wherein each machine learning model of the group of machine learning models has been operated as an active machine learning model instance.

14. A non-transitory machine-readable medium, comprising executable instructions that, when executed by at least one processor of a network model host, facilitate performance of operations, the operations comprising:

publishing machine learning model capability data of the network model host, wherein the machine learning model capability data comprises supported model names, input key performance indicators, and output actions associated with the network model host;

receiving, based on the publishing, a machine learning model in association with machine learning model metadata and machine learning parameter data comprising defined Yang files;

generating explanatory data comprising observed input feature values mismatched with training values used to train the machine learning model;

estimating complexity data representing time and resources needed to collect each input feature and impact on inference delay and, in response to compute resource congestion, removing one or more input features indicated by feature importance data in the machine learning model metadata; and training the machine learning model using local data to obtain an inference result, wherein the local data is local to the network model host, wherein the machine learning model has been deployed using a defined NETCONF protocol that modifies at least one setting of the network model host.

15. The non-transitory machine-readable medium of claim 14, wherein the operations further comprise, in response to an evaluation of the inference result being determined not to satisfy criterion data, outputting a request for remote training.

16. The non-transitory machine-readable medium of claim 15, wherein the inference result is a first inference result, wherein the criterion data comprises first criterion data, and wherein the operations further comprise:

receiving, in response to the request, updated hyper-parameter data, updated machine learning model metadata, and updated machine learning parameter data, and retraining the machine learning model based on the updated hyper-parameter data to obtain a second inference result.

17. The non-transitory machine-readable medium of claim 14, wherein the network model host comprises a radio access network intelligent controller of network service management and orchestration equipment.

18. The non-transitory machine-readable medium of claim 14, wherein the network model host comprises a radio access network node.

19. The method of claim 9, wherein the network system comprises a radio access network intelligent controller of network service management and orchestration equipment.

20. The method of claim 9, further comprising:

training, by the network system, the machine learning model using local data to obtain an inference result; and in response to an evaluation of the inference result, with respect to information in received machine learning model metadata, not satisfying the information in the machine learning model metadata, outputting, by the network system, a request for remote training.

* * * * *